United States Patent
Coleman

(10) Patent No.: US 7,699,380 B2
(45) Date of Patent: Apr. 20, 2010

(54) PROTECTION DEVICE FOR A VEHICLE

(76) Inventor: Roberta Coleman, 18175 E. Cornell Pl., Aurora, CO (US) 80013

( * ) Notice: Subject to any disclaimer, the term of this patent is extended or adjusted under 35 U.S.C. 154(b) by 0 days.

(21) Appl. No.: 11/625,484

(22) Filed: Jan. 22, 2007

(65) Prior Publication Data

US 2008/0174144 A1    Jul. 24, 2008

Related U.S. Application Data

(60) Provisional application No. 60/883,950, filed on Jan. 8, 2007.

(51) Int. Cl.
*B60J 11/00* (2006.01)
(52) U.S. Cl. .................. 296/136.02; 296/136.01; 296/136.07; 150/166
(58) Field of Classification Search ........ 296/136.01, 296/136.02, 136.07, 136.1, 137.06, 137, 296/136.17; 150/166, 167, 168
See application file for complete search history.

(56) References Cited

U.S. PATENT DOCUMENTS

| 5,312,145 A | | 5/1994 | McNeil | |
| 5,497,819 A | * | 3/1996 | Chiang | 296/136.01 |
| 5,800,006 A | | 9/1998 | Pettigrew | |
| 5,813,360 A | * | 9/1998 | Dickey, Jr. | 150/166 |
| 5,974,585 A | * | 11/1999 | Bachner, Jr. | 2/2.5 |
| 6,220,648 B1 | | 4/2001 | Daniel | |
| 6,565,139 B2 | | 5/2003 | Bayerle et al. | |
| 6,893,074 B1 | | 5/2005 | Wilson | |
| 2004/0048045 A1 | * | 3/2004 | Thomsen et al. | 428/180 |
| 2004/0189042 A1 | * | 9/2004 | Jarrard et al. | 296/136.01 |
| 2005/0269829 A1 | * | 12/2005 | Nilsrud et al. | 296/39.3 |

\* cited by examiner

*Primary Examiner*—Lori L Lyjak
(74) *Attorney, Agent, or Firm*—Marsh Fischmann & Breyfogle LLP

(57) ABSTRACT

An impact protection device and a method for protecting an object, such as a vehicle, using the impact protection device. The impact protection device is particularly useful for protecting a vehicle from damage due to hail storms. The impact protection device includes a layer of high tensile strength polymer and a metallic layer disposed adjacent to the high tensile strength polymer layer. The impact protection device is advantageously thin and lightweight and can be easily stored in the trunk of a vehicle for rapid deployment during a hail storm.

20 Claims, 3 Drawing Sheets

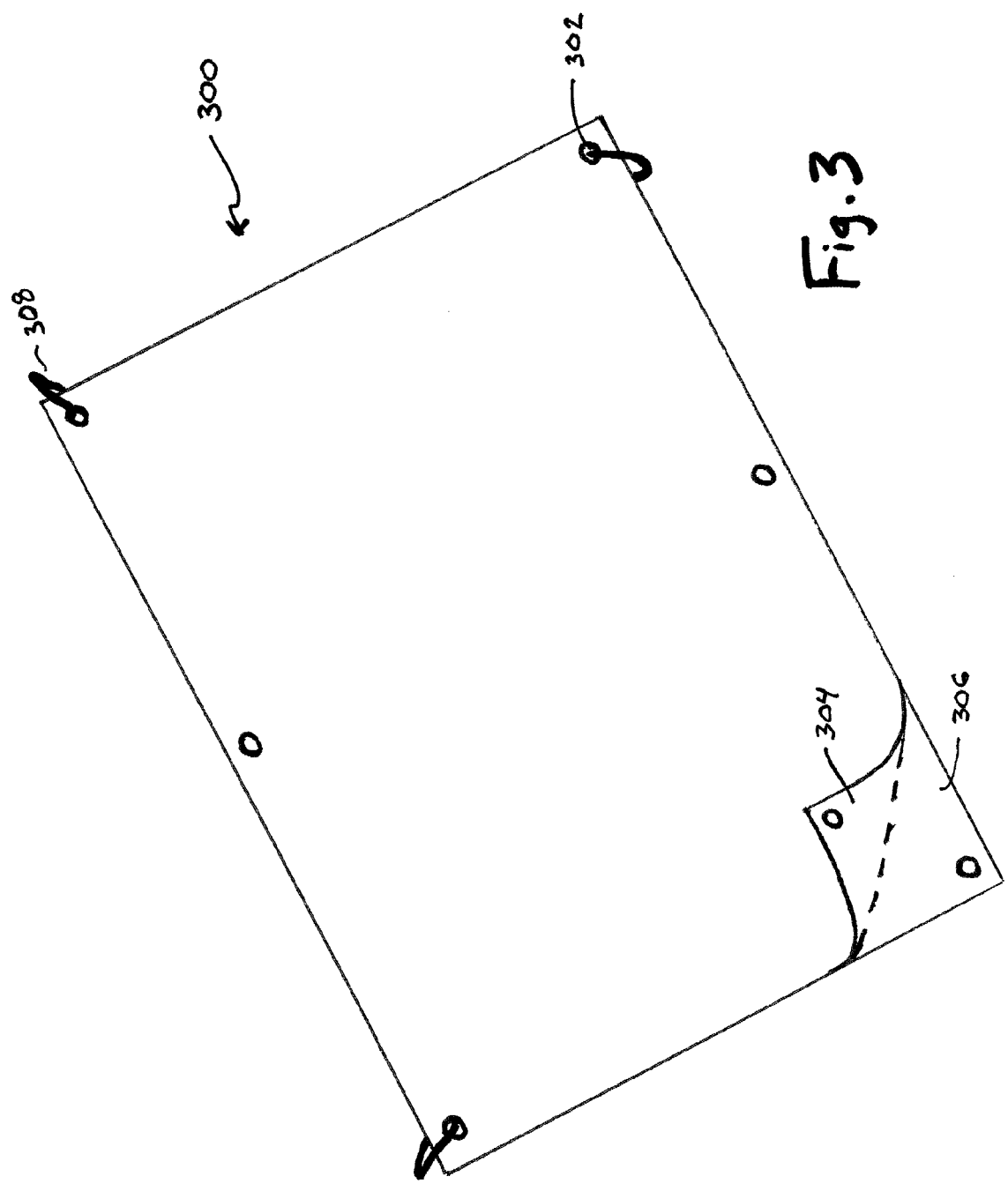

PROTECTION DEVICE FOR A VEHICLE

CROSS-REFERENCE TO RELATED APPLICATIONS

This application claims priority to U.S. Provisional Patent Application Ser. No. 60/883,950 entitled "Protection Device For A Vehicle", filed Jan. 8, 2007, the disclosure of which is incorporated herein by reference in its entirety.

BACKGROUND OF THE INVENTION

1. Field of the Invention

The present invention relates to the protection of objects such as vehicles from potentially damaging impact events, particularly hail storms. In one embodiment, the present invention relates to an impact protection device that is adapted to fit over a vehicle and reduce or eliminate the damage caused by hail storms.

2. Description of Related Art

Various types of devices have been proposed for the protection of vehicles from hail. For example, U.S. Pat. No. 6,893,074 by Wilson discloses a hail cover that consists of a neoprene rubber layer that is bonded to a sheet of light density, non-memory foam rubber. The thickness of each of the flexible rubber sheet and the non-memory foam rubber sheet is between ¼ inch and ⅜ inch, and the combined thickness is in the range of about ⅝ inch to about ¾ inch. The device is adapted to be used while the vehicle is in operation and does not cover windows, headlights or other portions of the vehicle.

U.S. Pat. No. 6,220,648 by Daniel discloses a hail protective shield which consists of multiple laminated layers. An outer layer of high-density polyethylene (HDPE) mesh is layered with closed cell foam to produce a two-ply covering material. A thin vinyl layer or polyethylene sheet can also be disposed between the HDPE mesh and the closed cell foam. The closed cell foam has a thickness of about 3/32 inch.

U.S. Pat. No. 5,800,006 by Pettigrew discloses a protective vehicle cover that includes a water proof vinyl layer disposed on two-sides of an impact resistant plastic material that is adapted to cover the top, sides, front and rear surfaces of a vehicle. The impact resistant plastic is in the form of plates that are constructed of polycarbonate plastic material in a spaced checker board-like fashion.

There remains a need for a lightweight and easily transportable device for the protection of vehicles during hail storms. It would be beneficial if the device could be stored in a relatively small volume and be quickly deployed in the event of a hail storm.

SUMMARY OF THE INVENTION

It is an object of the present invention to provide a lightweight and easily transportable device that is useful for the protection of vehicles during hail storms or similar situations. The device can be stored in a relatively small volume such as an automobile trunk and can be quickly deployed in the event of a hail storm.

The impact protection device according to the present invention includes a layer of high tensile strength polymer and a metallic layer, such as a metal foil, disposed adjacent to the high tensile strength polymer layer. The high tensile strength polymer can include aramid fibers or ultra-high molecular weight polyethylene. The metallic layer can include a thin layer of, for example, aluminum. The impact protection device can also include an outer layer of waterproof material to protect the device from degradation. Preferably, the impact protection device does not include a foam-type layer. It has been found that adequate protection can be provided without the need for a relatively thick foam layer.

DESCRIPTION OF THE DRAWINGS

FIG. 3 illustrates a perspective view of an impact protection device according to the present invention.

DESCRIPTION OF THE INVENTION

Figure 1:
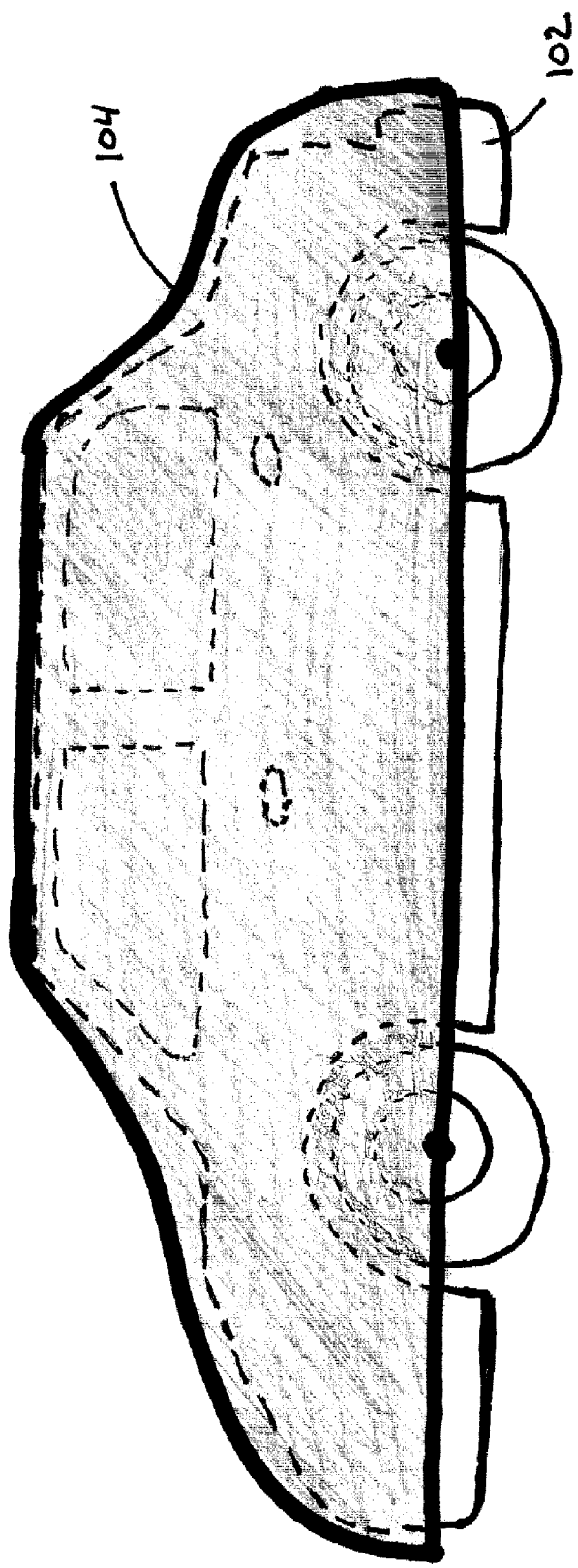
FIG. 1 illustrates a vehicle that is covered by an impact protection device according to the present invention.

FIG. 1 illustrates an impact protection device according to an embodiment of the present invention that is disposed upon a vehicle. The impact protection device 104 lays directly upon the vehicle and covers at least the top portions of the vehicle 102, such as the hood, trunk and roof. Preferably, the impact protection device 104 is also adapted to cover the side portions of the vehicle 102 that would be susceptible to damage during a hail storm, such as the doors and quarter panels of the vehicle 102.

The impact protection device 104 can be shaped to conform to the general shape of the vehicle 102. For example, the device 104 can include a top portion that is adapted to cover the hood, roof and trunk lid of the vehicle, with side portions that extend downwardly from the top portion to protect the sides of the vehicle. The impact protection device 102 can have a variety of shapes that are adapted to conformably fit to different types of vehicles, such as pickup trucks, sedans, minivans, or the like. However, the impact protection device can also have a polygonal shape, for example, a rectangular or square shape, such that the impact protection device can be placed over any vehicle or other object for which protection from hail damage is desired.

The impact protection device can also be provided with means for preventing accidental removal of the device, such as means for attaching the device to the vehicle or other object. For example, the edge portions of the device can be provided with weights to prevent the impact protection device from being blown off the vehicle by strong winds. Alternatively, the impact protection device can include magnets disposed along the edge portions of the device to magnetically attach to a metal surface and prevent the device from being easily removed from the vehicle. Further, apertures (e.g., grommets) can be provided in the device to provide points to attach the device to the vehicle, such as by using cord material (e.g., rope or elastic cord) to attach corners of the device to a vehicle.

Figure 2A:
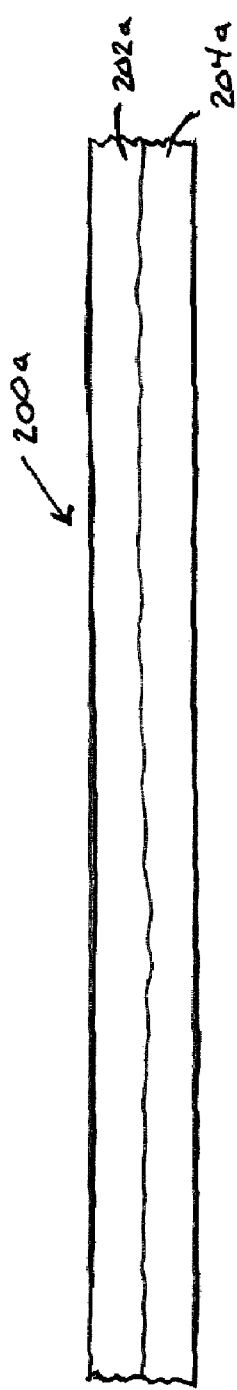
FIGS. 2a and 2b illustrate a cross-section of an impact protection device according to the present invention.

A cross-sectional view of a segment of an impact protection device according to the present invention is illustrated in FIG. 2a. The impact protection device 200a includes at least a first layer 202a of a high tensile strength polymer and includes a metallic layer 204a that is disposed adjacent to the high tensile strength polymer layer 202a. The high tensile strength polymer layer 202a has a high tensile strength, and in one embodiment has a tensile strength of at least about 3.0 GPa, more preferably at least about 3.4 GPa.

According to one embodiment, the high tensile strength polymer layer 202a is fabricated from aramid fiber, such as the aramid fiber products available from DuPont de Nemours and Company, Wilmington, Del., under the trade name KEVLAR, particularly KEVLAR 29. Aramid fibers are highly aromatic polyamide fibers that are derived from p-phenylenediamine and terephthaloyl chloride. The fibers consist of long molecular chains oriented along the length of the fiber. The fibers can be woven to form a thin layer.

Alternatively, the high tensile strength polymer layer can comprise ultra high molecular weight polyethylene, such as that sold by Honeywell under the name SPECTRA or SPECTRA SHIELD. This ultra high molecular weight polyethylene is formed by a gel-spinning process, which results in high toughness and good viscoelastic properties.

It is a particular advantage of the present invention that the high tensile strength polymer layer can be relatively thin. In one embodiment, the high tensile strength polymer layer has a thickness of not greater than about 0.05 inches (50 mils).

According to the present invention, a metallic layer 204a is disposed directly adjacent to the high tensile strength polymer layer 202a. It has been found that this combination of a high tensile strength polymer and a metallic layer advantageously leads to improved resistance to impact damage caused by hail or similar objects. The metallic layer 204a can be, for example, an aluminum layer. The metallic layer can optionally be bonded to the high tensile strength polymer layer, such as by using an adhesive to adhere the metallic layer to the polymer layer.

The metallic layer is also relatively thin and according to one embodiment has a thickness of not greater than about 0.125 inch, more preferably not greater than about 0.0625 inch, and even more preferably not greater than about 0.03 inch.

Thus, the total thickness of the impact protection device can advantageously be not greater than about 0.25 inches, and even more preferably not greater than about 0.125 inches.

Figure 2B:
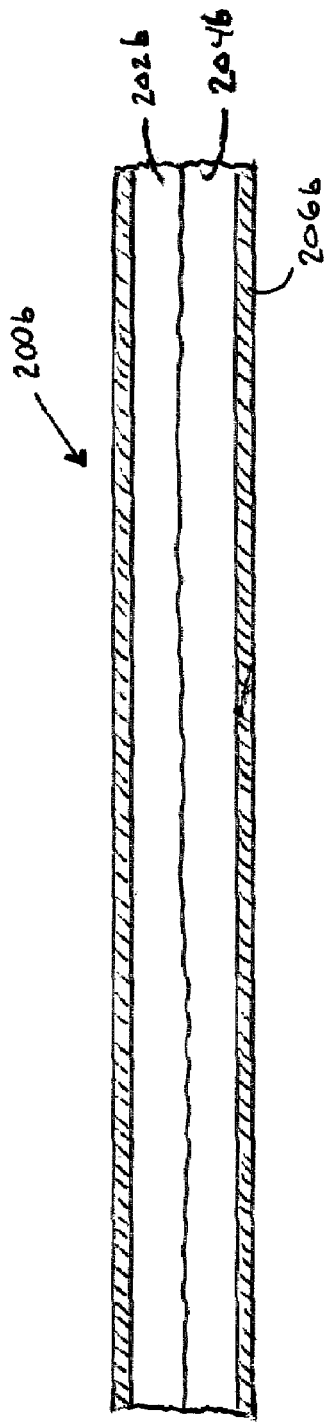

FIG. 2b illustrates a cross-section of an impact protection device 200b according to the present invention that includes a substantially waterproof material 206b as an outer layer surrounding the high strength polymer layer 202b and the metallic layer 204b. The waterproof material 206b can provide protection against deterioration, particularly for the high tensile polymer layer 202b, which may be susceptible to damage by continued exposure to the environment. The waterproof material 206b can be, for example, vinyl or any other polymer or similar material that can provide substantially waterproof protection. Further, one surface of the outer layer 206b can include a relatively soft material to prevent scratching or other damage to the vehicle surface when the device is placed on the vehicle.

FIG. 3 illustrates a perspective view of an impact protection device according to the present invention. The impact protection device 300 is of a generally polygonal shape such that the device 300 can be utilized to protect a variety of vehicles or similar objects from damage. The device 300 includes a plurality of apertures 302 that can be useful for attaching or otherwise securing the device 300 to prevent the device 300 from being displaced by the wind. For example, elastic bands 308 can be provided to attach the device 300 to the bumpers of a vehicle.

For purposes of illustration, one corner of the device 300 is illustrated with the high tensile strength polymer layer 304 being separated from the metallic layer 306.

The impact protection device according the present invention is advantageously thin and lightweight, as compared to similar devices in the prior art. The device can easily be folded and placed in the trunk of a vehicle without occupying a significant amount of space. In this way, the device can be rapidly deployed by a user during a hail storm or similar event.

EXAMPLES

In order to demonstrate the advantages of the impact protection device according to the present invention, the following tests are performed.

A common paintball gun is loaded with paint balls that are previously frozen to simulate large hail stones. An impact protection device is placed over a portion of a vehicle and the gun is then pointed at the vehicle and is fired in the direction of the impact protection device. Five different impact protection devices having different multilayer structures (Materials A through E) are tested on three different vehicles (Test 1, Test 2 and Test 3).

In each of the following examples, the high tensile strength polymer is KEVLAR 29 Style 745 Ballistic Fabric having a weight of 14 oz./sq. yd., a fiber density of 3000 denier with a plain weave and a thickness of 24.1 mils. (Part No. K29-745 available from Infinity Composites, Ashtabula, Ohio).

Comparative Material A includes KEVLAR, aluminum foil and a lightweight non-woven (cellulose-type) drop cloth (Rub-R-Tuff, Trimaco, Durham, N.C.). Comparative Material B includes a layer of KEVLAR and a ⅛ inch thick insulation layer comprising metal foil and foam (Frost King, available from Thermwell Products Company, Inc., Mahwah, N.J.). Material C includes KEVLAR and a layer of aluminum foil insulation (Reflectix, Markleville, Ind.) comprising two thin aluminum layers separated by 5/16 inch of dead air space, where one of the thin aluminum layers is disposed in contact with the KEVLAR. Material D includes KEVLAR and a thin HVAC foil tape layer adjacent to the KEVLAR. Comparative Material E includes KEVLAR and a layer of fiberglass mesh.

The frozen paintballs are fired at the impact protection device at an approximate velocity of 300 ft./sec. Each of the foregoing materials is tested as described above at a distance of ten feet and the results are visually observed. The results are listed in Table I.

TABLE I

| Material | Test 1 (shots/dents) | Test 2 (shots/dents) | Test 3 (shots/dents) | Total (shots/dents) |
| --- | --- | --- | --- | --- |
| A* | 3/1 | 3/2 | 3/3 | 9/6 |
| B* | 3/0 | 3/2 | 3/3 | 9/5 |
| C | 3/0 | 3/0 | 3/0 | 9/0 |
| D | 3/0 | 3/0 | 3/0 | 9/0 |
| E* | 3/0 | 3/1 | 3/2 | 9/3 |

*comparative examples

The materials with a cellulose-type layer (Comparative Material A), a foam layer (Comparative Material B) or a fiberglass layer (Comparative Material E) do not protect the vehicle from visible denting. However, the materials that include metal foil insulation (Material C) or metal foil tape (Material D) do provide protection from visible denting.

To further illustrate the advantages of the present invention, the Materials C and D are each tested at a distance of six feet and these results are illustrated in Table II.

TABLE II

| Material | Test 4 (shots/dents) |
| --- | --- |
| C | 3/0 |
| D | 3/0 |

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. An impact protection device adapted to fit over a vehicle, the impact protection device comprising:
   a layer of high tensile strength polymer; and
   a metallic layer disposed adjacent to said high tensile strength polymer layer, wherein said metallic layer is bonded to said layer of high tensile strength polymer over substantially the entire surface of the metallic layer, wherein the impact protection device is adapted to be easily folded and placed in the trunk of a vehicle.

2. The impact protection device as recited in claim 1, wherein said layer of high tensile strength polymer comprises aramid fibers.

3. The impact protection device as recited in claim 1, wherein said layer of high tensile strength polymer comprises ultra-high molecular weight polyethylene.

4. The impact protection device as recited in claim 1, wherein said layer of high tensile strength polymer layer has a thickness of not greater than about 0.05 inches.

5. The impact protection device as recited in claim 1, wherein said layer of high tensile strength polymer and said metallic layer have a combined thickness of not greater than 0.25 inch.

6. The impact protection device as recited in claim 1, wherein said metallic layer comprises aluminum.

7. The impact protection device as recited in claim 1, further comprising an outer layer of waterproof material.

8. A method for protecting a vehicle comprising the step of covering at least a portion of the vehicle with an impact protection device according to claim 1.

9. An impact protection device adapted to fit over a vehicle, the impact protection device comprising:
   a layer of high tensile strength polymer comprising aramid fibers; and
   a metallic layer that is disposed adjacent to said high tensile strength polymer layer, wherein said metallic layer is bonded to said layer of high tensile strength polymer.

10. The impact protection device as recited in claim 9, wherein said metallic layer comprises aluminum.

11. The impact protection device as recited in claim 10, further comprising an outer layer of waterproof material.

12. The impact protection device as recited in claim 1, wherein said layer of high tensile strength polymer has a tensile strength of at least about 3.0 GPa.

13. The impact protection device as recited in claim 1, wherein said layer of high tensile strength polymer has a tensile strength of at least about 3.4 GPa.

14. A method for protecting a vehicle comprising the step of covering at least a portion of the vehicle with an impact protection device, the impact protection device comprising:
   a layer of high tensile strength polymer having a tensile strength of at least about 3.0 GPa; and
   a metallic layer disposed adjacent to said high tensile strength polymer layer.

15. The method as recited in claim 14, wherein said layer of high tensile strength polymer has a tensile strength of at least about 3.4 GPa.

16. The method as recited in claim 14, wherein said layer of high tensile strength polymer comprises aramid fibers.

17. The method as recited in claim 14, wherein said layer of high tensile strength polymer comprises ultra-high molecular weight polyethylene.

18. The method as recited in claim 14, wherein said metallic layer comprises aluminum.

19. The method as recited in claim 14, wherein said impact protection device further comprises an outer layer of waterproof material.

20. The impact protection device as recited in claim 1, wherein the total thickness of the impact protection device is not greater than about 0.125 inches.

* * * * *